May 20, 1958 L. SCHLEBUSCH 2,835,775
SCREENING APPARATUS

Filed May 24, 1955 3 Sheets-Sheet 1

INVENTOR
LUDWIG SCHLEBUSCH

BY
Adams & Bush
ATTORNEYS

May 20, 1958  L. SCHLEBUSCH  2,835,775
SCREENING APPARATUS

Filed May 24, 1955  3 Sheets-Sheet 2

INVENTOR
LUDWIG SCHLEBUSCH

BY  *Adams + Bush*
ATTORNEYS

May 20, 1958  L. SCHLEBUSCH  2,835,775
SCREENING APPARATUS
Filed May 24, 1955  3 Sheets-Sheet 3

INVENTOR
LUDWIG SCHLEBUSCH

BY *Adams + Bush*
ATTORNEYS

United States Patent Office 2,835,775
Patented May 20, 1958

2,835,775

SCREENING APPARATUS

Ludwig Schlebusch, Palenberg, Germany

Application May 24, 1955, Serial No. 510,789

Claims priority, application Germany May 26, 1954

8 Claims. (Cl. 219—10.51)

The present invention relates to screening devices and has more reference to an electrically heated screen assembly for treating wet small products such as raw coal and the like and one which is particularly adapted for use in pneumatic screening devices for treating such products.

In pneumatic screening devices for treating wet small products such as raw coal and the like, it is known that the screen, usually a metal cloth or a perforated steel plate, for example, should either be heated, inductively, or by means of electric resistances, in order that the products being treated will not adhere to the screening surface, thus clogging the openings through which the air blast passes.

The heating of the screening surface in pneumatic screening devices of the aforesaid type is not efficient, or is rendered so only with a high expense of energy, as the air blasts directed upwardly through the screen cools the portions of the screen existing between the openings therein, while a certain amount of the heat produced is immediately dispersed by the metal screen itself, through radiation and conduction to the parts adjacent to the screen.

One object of the present invention is to provide, in a pneumatic screening device, a novel and improved electrically heated screen assembly which remedies the foregoing drawbacks.

Another object of the invention is to provide, in a pneumatic screening device, a novel and improved electrically heated screen assembly, as characterized above, comprising a perforated plate made of material having poor heat conductivity, having electrical heating means associated therewith for heating the upper separating surface of the screen assembly, including a metal element embedded in the plate near its upper surface or mounted on the upper surface of the plate and an inductor fitted under the plate for inductively heating the metal element.

Another object of the invention is to provide in a pneumatic screening device an improved electrically heated screen assembly, as characterized above, comprising a perforated plate made of material having poor heat conductivity and having a resistance-coil winding embedded therein near its upper surface for producing the required heat.

Another object of the present invention is to provide a novel and improved electrically heated screen assembly for use in treating small wet products such as raw coal and the like, comprising a perforated plate made of material having poor heat conductivity; and electrical means for heating the separating surface of the assembly including a metal element adapted to be heated electrically, carried by the plate and positioned above the bottom surface thereof, whereby heat losses due to radiation and conductivity will be substantially reduced.

Another object of the present invention is to provide a novel and improved electrically heated screen assembly, as characterized above, wherein the electrical means for heating the separating surface includes an inductor mounted adjacent to but spaced from the bottom surface of the perforated plate for heating the metal member by induction.

A further object of the present invention is to provide a novel and improved electrically heated screen assembly, as characterized above, wherein the metal member is in the form of a resistance coil-winding embedded in the perforated plate adjacent its upper surface and having terminal ends adapted to be connected to a source of electric current.

Other objects and advantages of the invention will appear in the following specification when considered in connection with the accompanying drawings, wherein.

The present invention provides a novel and improved electrically heated screen assembly for use in treating wet small products such as raw coal and the like; one which is particularly adapted for use in pneumatic screening devices, and is an improvement on the apparatus described in my co-pending applications Ser. No. 431,945, filed May 24, 1954, for Induction Influenced Screening Apparatus, and Ser. No. 470,099, filed November 11, 1954, for Screening Apparatus.

In general, the present invention comprises a perforated plate made of material having poor heat conductivity, having a metal member or element associated therewith which is adapted to be heated by induction from induction coils placed below the bottom of the plate. The metal member is either inserted or embedded in the upper surface of the plate or mounted on the upper surface of the plate so that the separating surface of the screen assembly will be heated and the heat loss due to radiation and conductivity will be greatly reduced. Also so that the separating surface of the screen and the metal member will be protected from the cooling effect exerted by the current of air entering at the bottom of the screen assembly and passing upwardly therethrough when the screen assembly is used in a pneumatic screening device. The invention further contemplates the metal member being embedded in the plate near the upper surface and being heated by resistance to an electric current passing therethrough. In both instances, the device is such that the heat in the metal member will not be dissipated by radiation or conduction and the metal member and the separating surface of the screen will not be cooled by the air blast.

Figure 1:
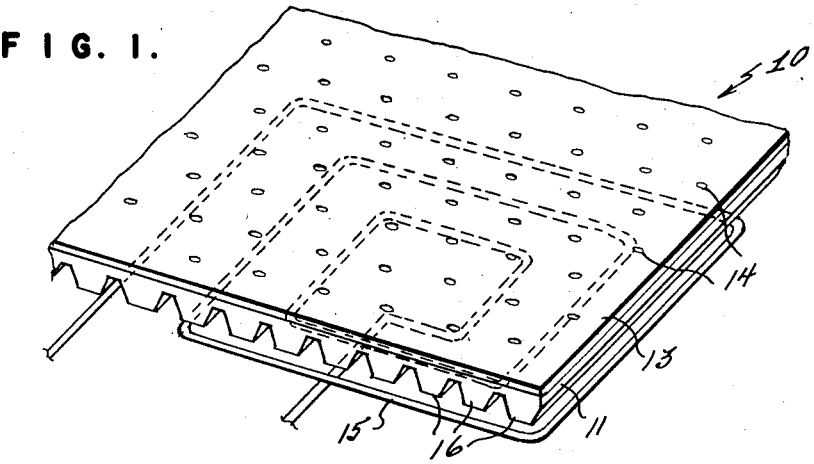
Fig. 1 is a fragmentary perspective view of one embodiment of an electrically heated screen assembly constructed in accordance with the present invention.
Figure 2:
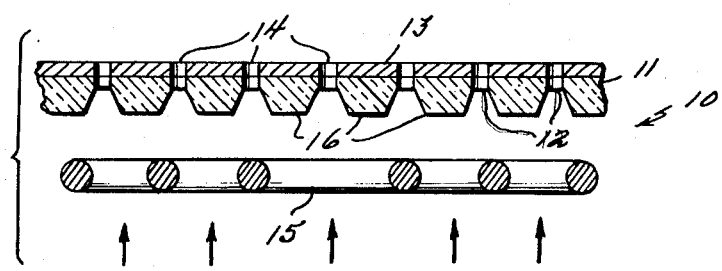
Fig. 2 is a fragmentary vertical cross sectional view of the screen assembly shown in Fig. 1.

Referring now to the drawings, there is illustrated, in Figs. 1 and 2, one embodiment of an electrically heated screen assembly constructed in accordance with the present invention. As there shown, the screen assembly, indicated generally at 10, comprises a plate 11 having a plurality of openings or perforations 12 formed therein, a metal heating element in the form of a metal sheet 13 having a plurality of openings or perforations 14 formed therein and mounted on the upper surface of the plate 11 so that the perforations in the sheet and the plate are in vertical alignment, and an inductor 15 positioned below the bottom surface of the plate 11 for heating the metal sheet by induction.

The perforated plate 11 may be made of any suitable material having poor heat conductivity, such as cast or synthetic material, asbestos plates, cardboard, stiff cloth, etc. The plate 11 is shown generally as a rectangular flat plate having a plurality of openings or perforations formed therein. The plate may be provided with ribs or supporting grates to avoid undesirable oscillation, if desired. As shown, the plate 11 has a plurality of longitudinally extending reinforcing ribs 16 formed on or cast integral therewith and made of the same material as the plate.

The metal sheet 13 may be made of any suitable metal capable of being heated by electrical induction. Preferably, and as shown, it is made of sheet steel. The metal sheet 13 is mounted on the plate 11 in any suitable manner, with the perforations 14 in the sheet in vertical alignment with the corresponding perforation in the plate 11. The perforations in the metal sheet 13 are made of such size that no part of the sheet will be exposed to the air currents which pass upwardly through the screen assembly, as indicated by the arrow in Fig. 2. In this particular modification, the metal sheet 13 is heated by induction by the inductor 15 which is mounted adjacent to but spaced from the bottom surface of the perforated plate 11.

Figure 3:
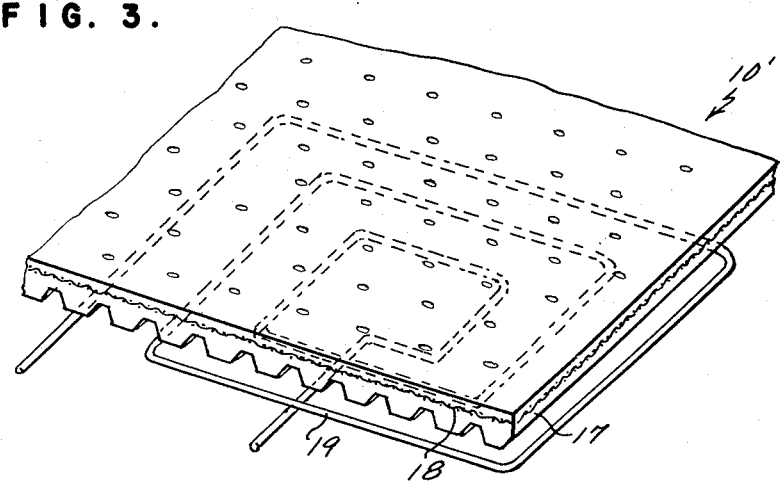
Fig. 3 is a view similar to that shown in Fig. 1, but showing a modified form of screen assembly.
Figure 4:
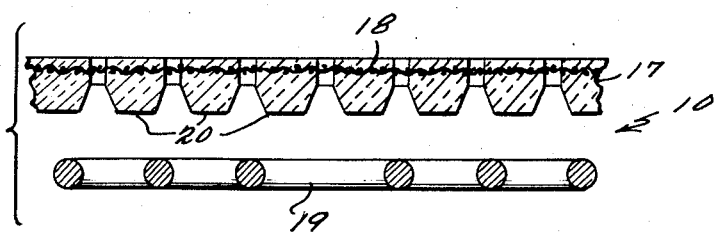
Fig. 4 is a fragmentary vertical cross sectional view of the screen assembly shown in Fig. 3.

Another embodiment of a screen assembly is illustrated in Figs. 3 and 4. In this particular modification, the screen assembly, indicated generally at 10', comprises a perforated plate 17; a metal heating element or member 18 inserted or embedded in the plate 17 adjacent its upper surface, and an inductor 19 for heating the metal element 18 by induction.

The perforated plate 17 is generally similar to the plate 11 of the modification shown in Figs. 1 and 2, and is made of material having poor heat conductivity. The plate 17 may also be provided with reinforcing ribs 20, if desired.

The metal element 18 may be of any suitable construction. As illustrated, it is shown as being in the form of a metal braid having openings therein aligned with the openings or perforations in the plate 17.

Figure 5:
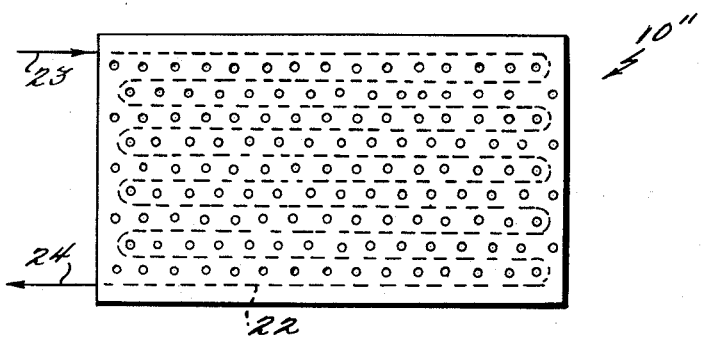
Fig. 5 is a top plan view of still another modified form of screen assembly.
Figure 6:
Fig. 6 is a fragmentary vertical cross sectional view of the screen assembly shown in Fig. 5.

In Figs. 5 and 6, there is illustrated still another modification of a screen assembly. In this particular modification, the screen assembly, indicated generally at 10', comprises a perforated plate 21 and a metal element 22 inserted or embedded in the plate 21 adjacent its upper surface.

The perforated plate 21 is a generally rectangular flat plate made of material having poor heat conductivity and has a plurality of perforations or openings formed therein. The plate may be provided with reinforcing ribs, as is plate 17, if desired. In this particular modification, the metal element 22 is shown in the form of a resistance coil-winding having its terminal ends 23, 24 adapted to be connected to a source of electrical current so that the coil-winding will produce the required heat for heating the upper surface of the perforated plate 21.

While the screen assembly of the present invention may be used in any suitable screen device for treating wet small products, such as raw coal and the like, it is particularly adapted for use in a pneumatic screening device such as shown and described in my aforesaid copending application, in that the perforated plate, which carries the metal heating element, in addition to greatly reducing heat losses due to radiation and conduction, protects the separating surface of the screen assembly and the heating element from the cooling effect of the blast of separating air passing upwardly through the screen assembly.

From the foregoing, it readily will be seen that there has been provided a novel and improved electrically heated screen assembly for use in screening devices for treating wet small products such as raw coal and the like; a screen assembly in which heat losses due to radiation and conduction are substantially reduced; and one which, when used in a pneumatic screening device, provides a layer of material at the bottom portion of the screen assembly for protecting the screening surface and the metal heating element from the cooling effect of the blast of separating air passing upwardly through the screen assembly.

Obviously, the invention is not restricted to the particular embodiments thereof herein shown and described.

What is claimed is:

1. In pneumatic screening apparatus for treating wet small products, such as raw coal and the like, an electrically heated screen assembly across the upper separating surface of which the products to be treated pass while a blast of air is directed upwardly therethrough to effect the desired separation, said screen assembly comprising a perforated supporting plate made of material having poor heat conductivity; and electrical heating means for heating the separating surface including a metal member adapted to be heated electrically carried by said plate and positioned above the lower surface thereof, said metal member having openings formed therein aligned with the perforations in said supporting plate, the construction and arrangement being such that heat losses due to radiation and conduction will be substantially reduced and the screening surface and the metal member will be protected against the cooling effect of the currents of air passing upwardly through the screen assembly.

2. Apparatus as set forth in claim 1, wherein said electrical heating means includes an inductor mounted adjacent to but spaced from the bottom surface of the perforated supporting plate for heating said metal member by inducing an electric current therein.

3. Apparatus as set forth in claim 1, wherein said metal member is embedded in said plate adjacent its upper surface.

4. Apparatus as set forth in claim 1, wherein said metal member is embedded in said plate adjacent its upper surface and wherein said electrical heating means includes an inductor mounted adjacent to but spaced from the bottom surface of said perforated supporting plate for heating said metal member by induction.

5. Apparatus as set forth in claim 1, wherein said metal member is in the form of a metal braid and is embedded in said perforated supporting plate adjacent its upper surface and wherein said electrical heating means includes an inductor mounted adjacent to but spaced from the bottom surface of said perforated plate for heating said metal member by induction.

6. Apparatus as set forth in claim 1, wherein said metal member is in the form of a perforated metal sheet mounted on the upper surface of said perforated supporting plate with the perforations in the metal sheet aligned with the perforations in the plate and wherein said electrical heating means includes an inductor mounted adjacent to but spaced from the bottom surface of said perforated supporting plate for heating said metal member by inducing an electric current therein.

7. Apparatus as set forth in claim 1, wherein said metal member is in the form of a resistance coil-winding embedded in said perforated supporting plate adjacent its upper surface with its terminal ends positioned to be connected to a source of electric current for producing heat in the coil-winding.

8. Apparatus as set forth in claim 1, wherein said perforated supporting plate has reinforcing ribs formed on its bottom surface.

References Cited in the file of this patent

UNITED STATES PATENTS

| 1,922,118 | Wooten | Aug. 15, 1933 |
| 2,615,115 | Watter | Oct. 21, 1952 |

FOREIGN PATENTS

| 621,099 | Great Britain | Apr. 4, 1949 |
| 930,471 | Germany | July 18, 1955 |